(12) United States Patent
Inutake et al.

(10) Patent No.: US 9,796,079 B2
(45) Date of Patent: Oct. 24, 2017

(54) ROBOT SYSTEM FOR CONVEYING ARTICLE IN SUSPENDED CONDITION

(71) Applicant: FANUC CORPORATION, Yamanashi (JP)

(72) Inventors: Hiroshi Inutake, Yamanashi (JP); Daisuke Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/143,632

(22) Filed: May 2, 2016

(65) Prior Publication Data

US 2016/0346918 A1 Dec. 1, 2016

(30) Foreign Application Priority Data

May 29, 2015 (JP) .................. 2015-110507

(51) Int. Cl.
 *G05B 19/418* (2006.01)
 *B25J 9/00* (2006.01)
 *B25J 9/16* (2006.01)

(52) U.S. Cl.
 CPC .......... *B25J 9/0084* (2013.01); *B25J 9/1682* (2013.01)

(58) Field of Classification Search
 CPC .................. B25J 9/0084; B25J 9/1682
 See application file for complete search history.

(56) References Cited

U.S. PATENT DOCUMENTS

| 6,114,824 A * | 9/2000 | Watanabe | B25J 9/1697 29/407.04 |
| 6,332,861 B1 * | 12/2001 | Otsuka | B23Q 3/15706 483/13 |
| 2013/0134236 A1 * | 5/2013 | Uematsu | B05B 15/08 239/536 |

FOREIGN PATENT DOCUMENTS

| CN | 101637908 A | 2/2010 |
| JP | 5-162974 A | 6/1993 |
| JP | 7-290393 A | 11/1995 |
| JP | 10-277982 A | 10/1998 |
| JP | 2002-308429 A | 10/2002 |
| JP | 2008-279549 A | 11/2008 |
| JP | 2009-262304 A | 11/2009 |
| JP | 2011-161616 A | 8/2011 |
| JP | 2012-35370 A | 2/2012 |
| JP | 2013-184278 A | 9/2013 |
| JP | 2013-212580 A | 10/2013 |
| JP | 2014-50904 A | 3/2014 |
| JP | 2014-148040 A | 8/2014 |
| JP | 2014-176918 A | 9/2014 |

* cited by examiner

Primary Examiner — Ian Jen
(74) Attorney, Agent, or Firm — Hauptman Ham, LLP

(57) ABSTRACT

A robot system comprises a first robot which supports a suspending jig for suspending a workpiece, a second robot which supports a hand, and a control device which performs cooperative control for causing the first robot and the second robot to operate cooperatively. The hand grasps the workpiece at a portion which is lower than a mating portion of the workpiece. In the robot system, the control device performs cooperative control so that the workpiece is conveyed while a condition in which the hand grasps the article is maintained.

7 Claims, 8 Drawing Sheets

ROBOT SYSTEM FOR CONVEYING ARTICLE IN SUSPENDED CONDITION

RELATED APPLICATIONS

The present application claims priority to Japanese Patent Application Number 2015-110507 filed May 29, 2015, the disclosure of which is hereby incorporated by reference herein in its entirety.

BACKGROUND OF THE INVENTION

1. Field of the Invention

The present invention relates to a robot system for conveying an article.

2. Description of Related Art

In a product manufacturing factory or the like, articles may be conveyed from the initial positions to the target positions. When using a robot to convey an article, the article may be lifted up and conveyed by the robot while an end effector of the robot grasps or suctionally holds the article. It is also known in the prior art to provide a conveyance device for conveying an article in a suspended condition.

Japanese Unexamined Patent Publication No. H05-162974 discloses a conveyance device which comprises runner rails, a movable crane unit which includes a liftable hook, a roll grasping mechanism which is suspended by the hook of the crane unit and is used to grasp a mill roll, and a chock rotating mechanism for rotating the chock of the mill roll grasped by the roll grasping mechanism. It is also disclosed in this patent publication that the device further comprises a swinging stop mechanism for preventing the roll grasping mechanism and the chock rotating mechanism from swinging with respect to the crane unit.

When conveying various kinds of articles, among others, a heavy article, for example, one possible method to be employed would be to convey the article in a suspended condition. However, in the case of the conveyance device in which the crane travels on the rails as disclosed in the above patent publication, the direction in which the article is conveyed is limited to the direction along which the rails extend. Furthermore, the conveying speed is slow because the crane travels on the rails. Moreover, one might want to change the orientation of the article during conveyance, but it is difficult to change the orientation of the article during conveyance.

When conveying an article in a suspended condition without using a conveyance device equipped with runner rails, it has been the prior practice to connect a jig to the article and to suspend the article by lifting the jig using a hoist. Then, while keeping the article in the suspended condition, an operator moves the article to the desired position by holding the article by his hand. Then, the article is placed in the desired position by lowering the jig using the hoist. Since the article is moved by hand in this way, the prior practice has had the problem that not it takes time and labor to accomplish the task and safety precautions have to be taken in order to prevent accidents such as dropping the article during conveyance.

SUMMARY OF INVENTION

A robot system according to the present invention is a robot system for conveying an article, and comprises a suspending jig which includes an engaging portion for engaging with a mating portion of the article, and which suspends the article, and a first robot which supports the suspending jig. The robot system comprises a hand which grasps the article when the article is suspended, and a second robot which supports the hand. The robot system comprises a control device which performs cooperative control for causing the first robot and the second robot to operate cooperatively. The hand grasps the article at a portion which is lower than the mating portion. In the robot system, the control device performs cooperative control so that the position of the hand relative to the suspending jig is maintained constant, and so that the article is conveyed while a condition in which the hand grasp the article is maintained.

In the above invention, the control device can be configured as a single device which controls the first robot and the second robot.

In the above invention, the control device can include a first control device which controls the first robot and a second control device which controls the second robot, and the first control device and the second control device can be interconnected via a communication line so as to perform cooperative control.

In the above invention, the robot system can comprise an image device for capturing an image of the article or a pallet on which the article is placed. The control device can prestore a reference image when the first robot and the second robot are in a reference position and a reference posture. The control device can compute an amount of correction for the position and the posture of the first robot and the second robot based on the image captured by the image device and on the reference image, and correct the position and the posture of the first robot and the second robot based on the amount of correction.

In the above invention, the robot system can comprise a carry-in device for delivering the article. The image device can include a camera attached to the suspending jig, and capture an image of the mating portion when the carry-in device transports the article to a predetermined position. The control device can correct the position and the posture of the first robot and the second robot based on the image of the mating portion captured by the image device.

In the above invention, the image device can include a camera immovably supported on a floor, and capture an image of the article on the way of conveying the article in a suspended condition. The control device can correct the position and the posture of the first robot and the second robot based on the image of the article captured by the image device.

In the above invention, the robot system can comprise a carry-out device for discharging the article which is placed on the discharge pallet. The image device can include a camera immovably supported on a floor, and capture an image of the discharge pallet when the carry-out device transports the discharge pallet to a predetermined position. The control device can correct the position and the posture of the first robot and the second robot based on the image of the discharge pallet captured by the image device.

DETAILED DESCRIPTION

A robot system according to an embodiment will be described below with reference to FIGS. 1 to 10. The robot system according to the present embodiment conveys a workpiece serving as an article to be conveyed, from an initial position to a target position by using a plurality of robots. The plurality of robots convey the workpiece in a suspended condition.

Figure 1:
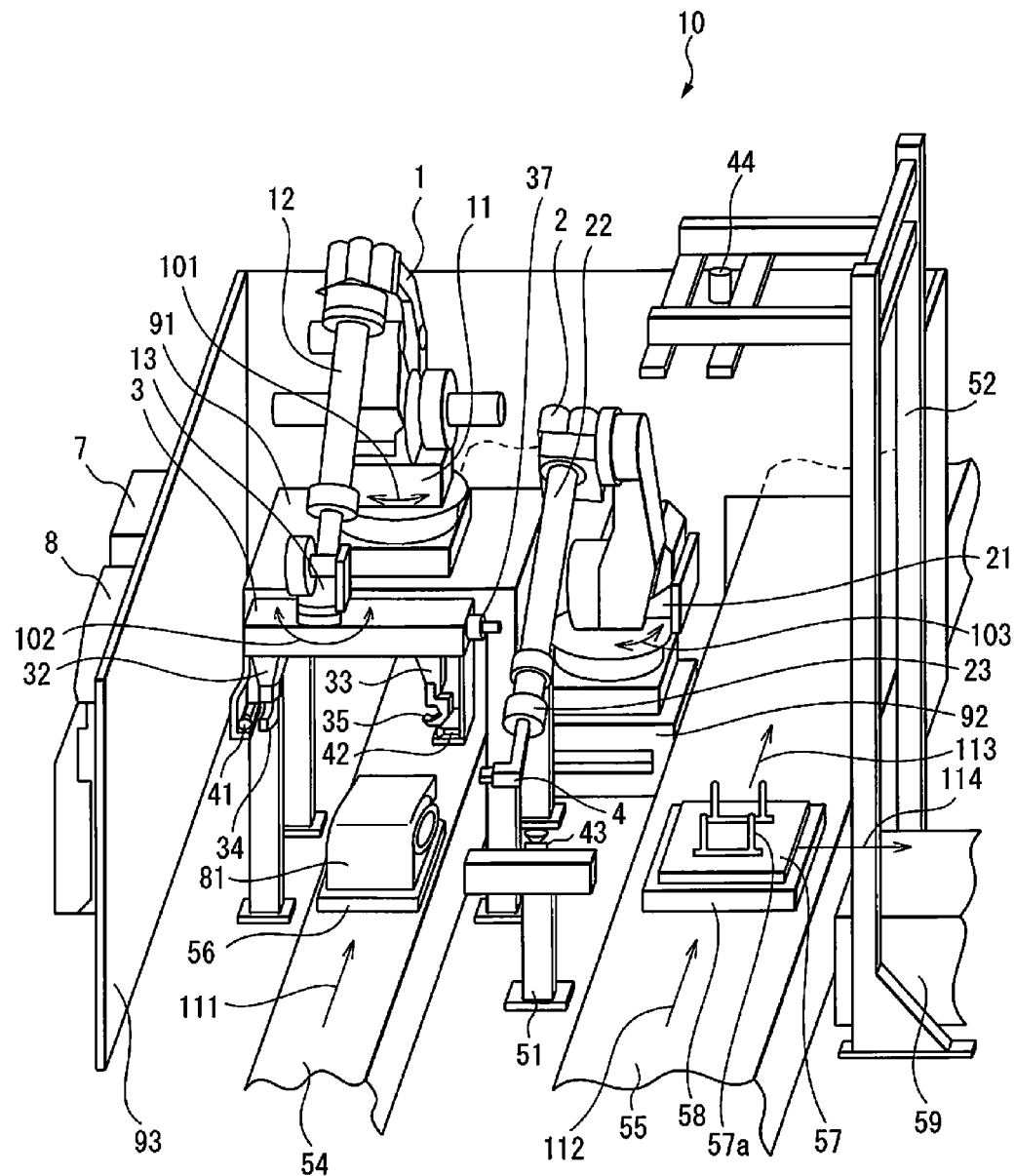
FIG. 1 is a schematic perspective view of a robot system according to an embodiment.

FIG. 1 shows a schematic perspective view of the robot system according to the present embodiment. The robot system 10 according to the present embodiment comprises a first robot 1 and a second robot 2. In the present embodiment, the first robot 1 and the second robot 2 are each an articulated robot with six degrees of freedom. The following description is given by taking a workpiece 81, a heavy article, as an example of the article to be conveyed.

The robot system 10 includes a carry-in conveyor 54 serving as a carry-in device for delivering the workpiece 81 to the initial position, and carry-out conveyors 55 and 59 serving as a carry-out device for discharging the workpiece 81 which has been transported to the target position. The carry-in conveyor 54 and the carry-out conveyors 55 and 59 may each be constructed from a roller conveyor or the like. The carry-in conveyor 54 is driven in the direction indicated by an arrow 111 and delivers the workpiece 81 to the predetermined initial position. The workpiece 81 is delivered by being placed on a delivery pallet 56. The initial position of the workpiece 81 is the position of the workpiece 81 when the delivery pallet 56 has been transported to the predetermined position. The initial position of the workpiece 81 is also the position where a suspending jig 3 connected to the first robot 1 and a hand 4 connected to the second robot 2 engage the workpiece 81.

The carry-out conveyor 55 is driven in the direction indicated by an arrow 112 and conveys discharge pallets 57 and 58 to the predetermined position. The discharge pallet 58 is placed on the carry-out conveyor 55 and serves as the base of the discharge pallet 57. The discharge pallet 57 is placed on the discharge pallet 58, and the workpiece 81 is placed on the discharge pallet 57. The target position of the workpiece 81 is the position of the workpiece 81 where it is placed onto the discharge pallet 57. The first robot 1 and the second robot 2 convey the workpiece 81 from the initial position to the target position in cooperative motions. The target position is the position where the suspending jig 3 and the hand 4 release engagement with the workpiece 81. In the present embodiment, the robot system 10 rotates the workpiece 81 through 90 degrees around an axis of rotation extending in the vertical direction during the conveying period. That is, the robot system 10 changes the orientation of the workpiece 81 during the conveying period.

The carry-out conveyor 55 includes a movement device for moving the discharge pallet 57 onto the carry-out conveyor 59. When the conveyance of the workpiece 81 by the first robot 1 and the second robot 2 is completed, the movement device lifts the discharge pallet 57 off the discharge pallet 58. Then, the movement device moves the discharge pallet 57 onto the carry-out conveyor 59, as indicated by an arrow 114. The carry-out conveyor 59 is driven so as to discharge the workpiece 81. The discharge pallet 58 is left on the carry-out conveyor 55. The carry-out conveyor 55 is driven so as to discharge the discharge pallet 58, as indicated by an arrow 113. The first robot 1 in the present embodiment is arranged above the carry-in conveyor 54. The second robot 2 is arranged between the carry-in conveyor 54 and the carry-out conveyor 55.

The first robot 1 is fixed to a supporting base 91. The first robot 1 includes a swiveling portion 11 which swivels on the supporting base 91 as indicated by an arrow 101. In the present embodiment, the swiveling portion 11 is constructed so as to be rotatable around the axis of rotation extending in the vertical direction. The first robot 1 includes an arm 12 and wrist 13 which rotate in integral fashion with the swiveling portion 11. The first robot 1 has a plurality of joints and is configured so that the orientations of the arm 12 and wrist 13 can be changed at the joints.

The suspending jig 3 serving as an end effector is attached to the wrist 13 of the first robot 1. The first robot 1 supports the suspending jig 3. The wrist 13 is configured so as to rotate the suspending jig 3 as indicated by an arrow 102.

The second robot 2 is fixed to a supporting base 92. Similarly to the first robot 1, the second robot 2 includes a swiveling portion 21 which swivels on the supporting base 92 as indicated by an arrow 103, and an arm 22 and wrist 23 which rotate in integral fashion with the swiveling portion 21. The swiveling portion 21 is constructed so as to be rotatable on the supporting base 92 around the axis of rotation extending in the vertical direction. The hand 4 serving as an end effector is attached to the wrist 23 of the second robot 2. The hand 4 is configured to grasp the workpiece 81.

The robot system 10 includes a control device 7 which performs cooperative control for causing the first robot 1 and the second robot 2 to operate cooperatively. The robot system 10 further comprises a teaching device 8 which, in advance, teaches taught points to the first robot 1 and the second robot 2. The robot system 10 also comprises a wall portion 93 surrounding a work area. The control device 7 and the teaching device 8 are located outside the wall portion 93.

Figure 2:
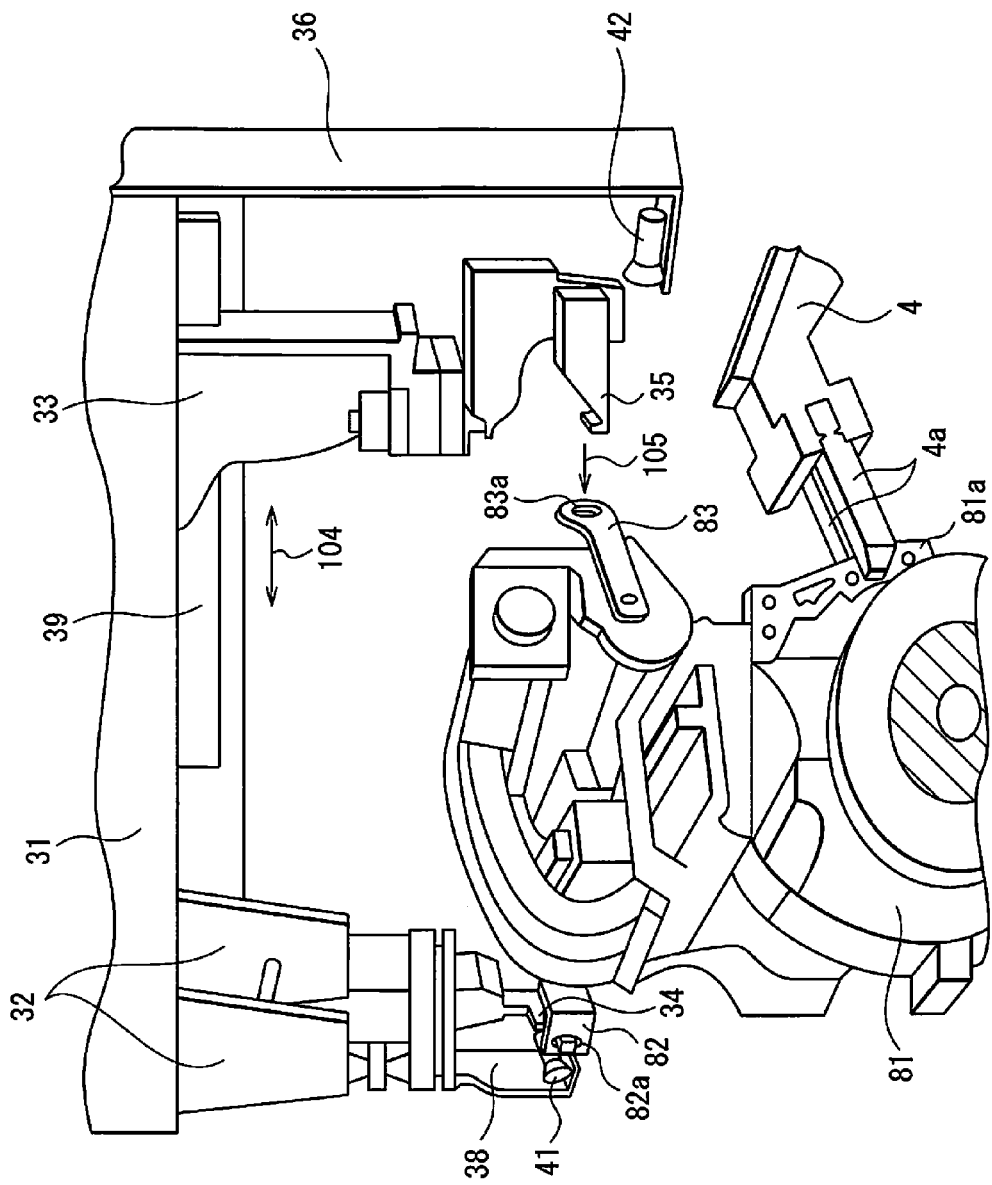
FIG. 2 is an enlarged perspective view illustrating a suspending jig, a workpiece, and a hand according to the embodiment.

FIG. 2 shows an enlarged perspective view illustrating the suspending jig, the workpiece, and the hand. Referring to FIGS. 1 and 2, the suspending jig 3 includes a base member 31 which has a longitudinal direction and a fixing member 32 fixed to the base member 31. The fixing member 32 is arranged at one end part of the base member 31 in the longitudinal direction. The fixing member 32 extends downward from the base member 31.

The suspending jig 3 includes a rail 39 fixed to the base member 31. The rail 39 extends along the longitudinal direction of the base member 31. The suspending jig 3 includes a moving member 33 which moves along the rail 39 by being supported on the rail 39. The moving member 33 extends downward in the vertical direction. The suspending jig 3 includes a driving motor 37 which drives the moving member 33. The moving member 33 moves along the longitudinal direction of the base member 31 as indicated by an arrow 104 by drive of the driving motor 37. In the present embodiment, a ballscrew mechanism is used to move the moving member 33.

The suspending jig 3 includes a first pawl 34 fixed to the fixing member 32. The suspending jig 3 includes a second pawl 35 fixed to the moving member 33. The first pawl 34 and the second pawl 35 each function as an engaging portion which engages with a mating portion of the workpiece 81.

The suspending jig 3 may be configured so that the first pawl 34 is rotatable with respect to the base member 31 about the axis of rotation extending in the vertical direction. That is, the configuration may be such that the first pawl 34 can change an orientation relative to the base member 31. By adopting this configuration, the orientation of the first pawl 34 can be changed within the horizontal plane, making it possible to suspend various kinds of workpieces.

The workpiece 81 includes brackets 82 and 83 which function as the mating portions with which the first pawl 34 and the second pawl 35 respectively engage. In the present embodiment, the brackets 82 and 83 are each fixed to the workpiece 81 with a bolt. The mating portions is not limited to the above-described embodiment, but may be formed in a main body of workpiece 81. The bracket 82 is formed with a hole 82*a* into which the first pawl 34 is inserted. That is, the first pawl 34 engages with the hole 82*a*. The bracket 83 is formed with a hole 83*a* into which the second pawl 35 is inserted. That is, the second pawl 35 engages with the hole 83*a*.

In the workpiece 81, a portion to be grasped 81*a* which is grasped by the hand 4 supported by the second robot 2 is formed. The portion to be grasped 81*a* according to the present embodiment is configured by a part of a main body of the workpiece 81. In the present embodiment, the hand 4 has two pawl portions 4*a* which can be opened and closed. The hand 4 functions as a grasping portion. The hand 4 grasps the portion to be grasped 81*a* by closing two pawl portions 4*a*. The portion to be grasped 81*a* is not limited to the above-described embodiment, but may be formed in any desired structure with which the workpiece 81 can be grasped.

The robot system 10 in the present embodiment has the function of correcting a positional displacement of the workpiece 81, the delivery pallet 56, or the discharge pallet 57. The robot system 10 is equipped with a two-dimensional visual sensor serving as an image device for capturing an image of the workpiece 81 or the discharge pallet 57. Based on the two-dimensional image captured by the image device, the robot system 10 corrects the position and the posture of the first robot 1 and the second robot 2. In the present embodiment, three image devices are provided. Use may be made of a three-dimensional visual sensor or the like as the image device.

Referring to FIGS. 1 and 2, the first image device comprises a first camera which is attached to the suspending jig 3. Two first cameras are provided in the present embodiment. A camera 41 for capturing an image of the bracket 82 and a camera 42 for capturing an image of the bracket 83 are provided as the first cameras. The camera 41 is supported by a supporting member 38 fixed to the fixing member 32. The camera 42 is supported by a supporting member 36 fixed to the base member 31. In the present embodiment, the camera 41 is disposed in the vicinity of the first pawl 34. On the other hand, the camera 42 is disposed in the vicinity of the second pawl 35. The cameras 41 and 42 as the first image device can be suitably positioned so as to be able to capture images of the mating portions of the workpiece 81 before the suspending jig 3 engages the workpiece 81. One or the other of the cameras 41 and 42 may be provided as the first camera.

The second image device comprises a camera 43 serving as a second camera which is immovably supported on the floor. The camera 43 is supported by a camera supporting base 51. The camera 43 captures an image of the workpiece 81 on the way of conveying the workpiece 81 in a suspended condition. The camera 43 in the present embodiment is disposed so as to shoot the workpiece 81 from below. The camera 43 as the second image device can be positioned so as to be able to capture an image of the workpiece 81 in the state in which the workpiece 81 is suspended.

The third image device comprises a camera 44 serving as a third camera which is immovably supported on the floor. The camera 44 is supported by a camera supporting base 52. The camera 44 captures an image of the discharge pallet 57 when the discharge pallet 57 is transported to the predetermined position by the carry-out device. The camera 44 in the present embodiment is located above the carry-out conveyor 55. The camera 44 as the third image device can be suitably positioned so as to be able to capture an image of the discharge pallet 57 when the discharge pallet 57 is located in the predetermined position.

Figure 3:
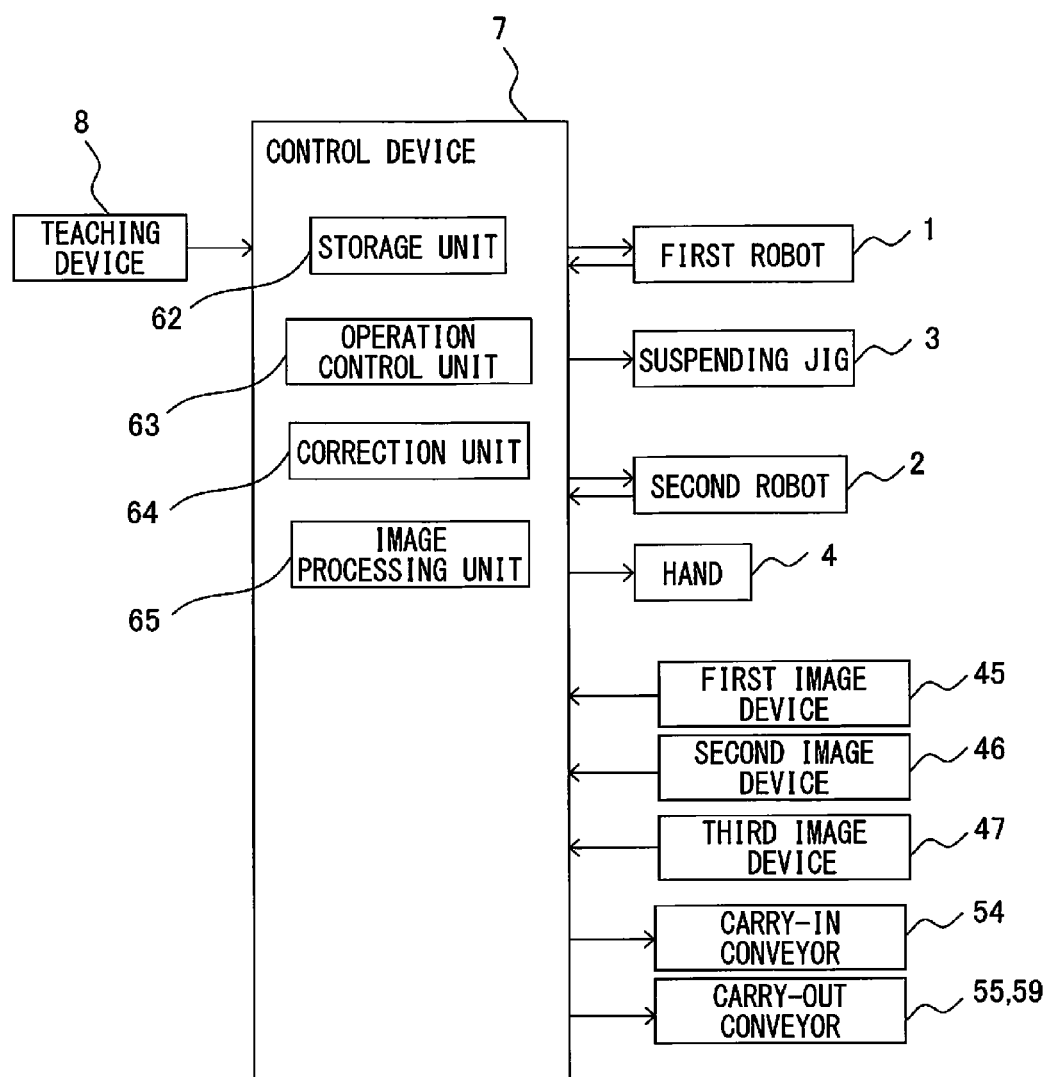
FIG. 3 is a block diagram of the robot system according to the embodiment.

FIG. 3 shows a block diagram of the robot system according to the present embodiment. The control device 7 used in the robot system 10 is configured as a single device which controls the first robot 1 and the second robot 2. Further, the teaching device 8 is configured as a single device which teaches position and posture to the first robot 1 and also teaches position and posture to the second robot 2. That is, the control device 7 and the teaching device 8 are devices common to the first robot 1 and the second robot 2.

The operator teaches taught points to the first robot 1 and the second robot 2 by using the teaching device 8, thereby preset the operations of the first robot 1 and the second robot 2. Alternatively, the operations of the first robot 1 and the second robot 2 may be preprogrammed in the form of an operation program. The control device 7 in the present embodiment performs cooperative control for causing the first robot 1 and the second robot 2 to operate cooperatively. In the cooperative control, the position of the hand 4 relative to the suspending jig 3 is maintained constant. In the cooperative control according to the present embodiment, the first robot 1 functions as the master robot, and the second robot 2 functions as the slave robot. The position and the posture of the second robot 2 are determined based on the position and the posture of the first robot 1. The second robot 2 operates so as to follow the operation of the first robot 1. The second robot 2 is driven in integral fashion with the first robot 1 so as to match the operation of the first robot 1.

The control device 7 includes a storage unit 62 which stores preset taught points. The control device 7 includes an operation control unit 63 which controls the actuation of the first robot 1, the second robot 2, the suspending jig 3, and the hand 4. The operation control unit 63 also controls the operation of the carry-in conveyor 54 and the carry-out conveyors 55 and 59.

The control device 7 includes an image processing unit 65 which processes the images captured by the first image device 45, second image device 46, and third image device 47. The control device 7 includes a correcting unit 64 which computes the amount of correction for the position and the posture of the first robot 1 and the second robot 2.

Based on the image captured by the first image device 45, the image processing unit 65 computes the amount of positional displacement of the workpiece 81 delivered by the carry-in conveyor 54. Based on the image captured by the second image device 46, the image processing unit 65 computes the amount of positional displacement of the workpiece 81 when the workpiece 81 is suspended by the suspending jig 3. Based on the image captured by the third image device 47, the image processing unit 65 computes the amount of positional displacement of the discharge pallet 57 transported by the carry-out conveyor 55. Based on these amounts of displacement, the correction unit 64 computes the amount of correction for the first robot 1 and the second robot 2. Then, based on the computed amount of correction, the operation control unit 63 corrects the position and the posture of the first robot 1 and the second robot 2.

In the control device 7 according to the present embodiment, the reference position and reference posture of each robot are predetermined. In the present embodiment, the position taught by the teaching device 8 provides the reference position of the robot, and the posture taught by the teaching device 8 provides the reference posture of the robot. The reference position and reference posture of each robot at the time when the respective image devices captures images are predetermined in the control device 7. The control device 7 prestores reference images captured when the respective robots are in the predetermined reference position and reference posture. Then, based on the reference images and the images captured by the respective image devices, the control device 7 computes the amount of correction for the position and the posture of the respective robots.

Figure 4:
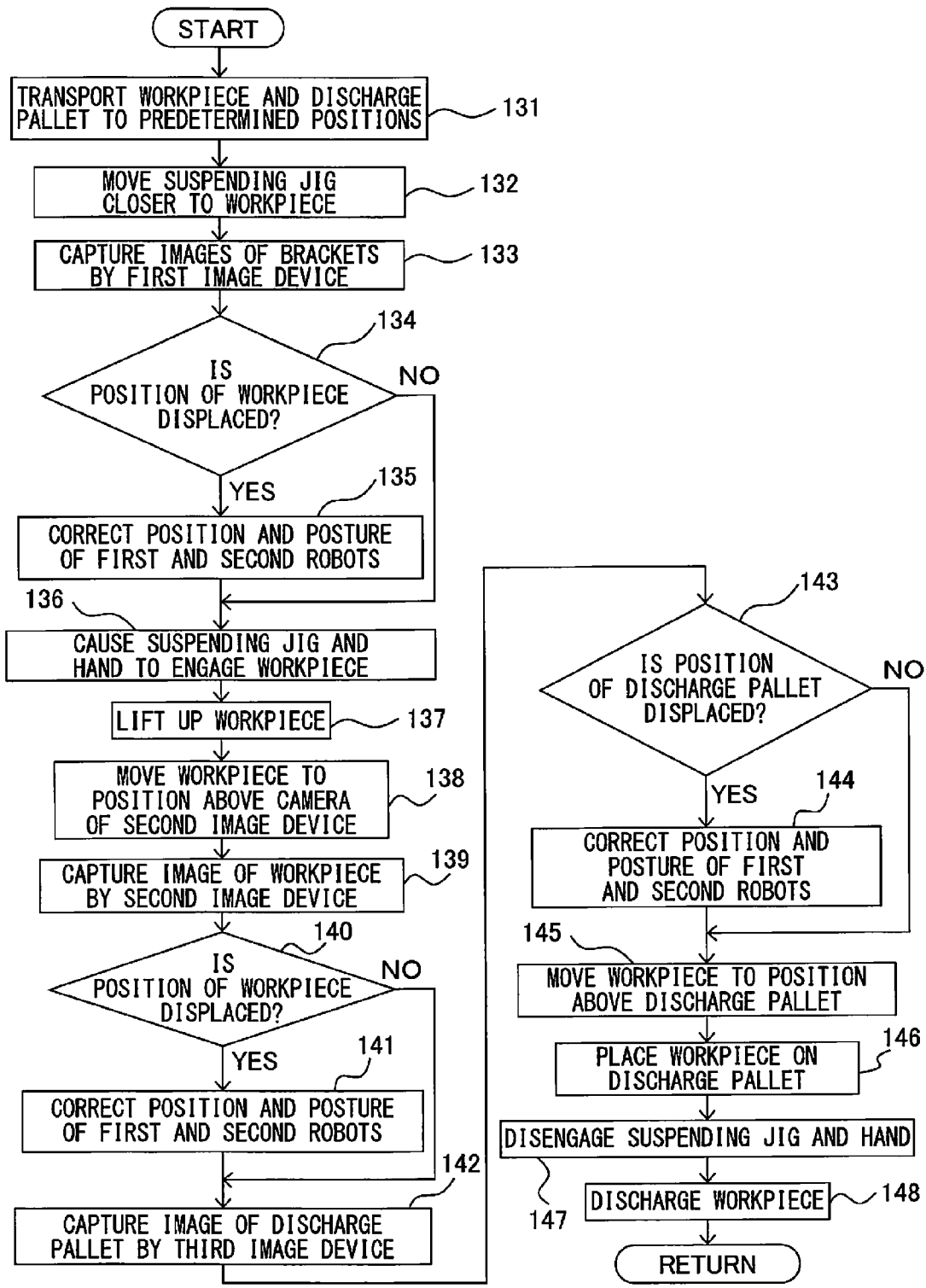
FIG. 4 is a flowchart illustrating control performed by the robot system according to the embodiment.

FIG. 4 shows a flowchart illustrating control performed by the robot system according to the present embodiment. The control process of FIG. 4 concerns the control performed when conveying one workpiece 81. When conveying a plurality of workpieces 81, the control process of FIG. 4 can be performed repeatedly.

Referring to FIGS. 1 and 4, in step 131 the workpiece 81 and the discharge pallets 57 and 58 are transported to the predetermined positions. The control device 7 controls the carry-in conveyor 54 to transport the workpiece 81 to the initial position. Further, the control device 7 controls the carry-out conveyor 55 so as to transport the discharge pallets 57 and 58 to the position corresponding to the target position of the workpiece 81.

Referring to FIGS. 2 to 4, in step 132 the suspending jig 3 is moved to a predetermined position in the vicinity of the workpiece 81. The suspending jig 3 moves to the position where the cameras 41 and 42 of the first image device 45 can capture images of the brackets 82 and 83 of the workpiece 81. The position and the posture of the first robot 1 in this condition are predetermined. The first pawl 34 is located away from the bracket 82. The second pawl 35 is located away from the bracket 83.

Next, in step 133, the images of the brackets 82 and 83 are captured by the first image device 45. The camera 41 captures the image of the bracket 82 before the first pawl 34 is brought into engagement with the bracket 82. Further, the camera 42 captures the image of the bracket 83 before the second pawl 35 is brought into engagement with the bracket 83.

Then, in step 134, the control device 7 judges whether the position of the workpiece 81 is displaced or not. The image processing unit 65 compares the images captured by the two cameras 41, 42 with the prestored reference images of the brackets 82 and 83. In the present embodiment, the image processing unit 65 compares the position of the hole 82*a* formed in the bracket 82. Further, the image processing unit 65 compares the position of the hole 83*a* formed in the bracket 83. Then, the image processing unit 65 computes the amount of displacement for each of the brackets 82 and 83. If the position of the hole 82*a*, 83*a* in the image captured by the camera 41, 42 is displaced by an amount larger than a predetermined threshold from the position of the hole 82*a*, 83*a* defined in the reference image, it can be judged that the position of the workpiece 81 is displaced. In this case, control proceeds to step 135.

In step 135, the correction unit 64 computes the amount of correction based on the amount of displacement for the position and the posture of the first robot 1 and the second robot 2. The correction unit 64 computes the amount of correction so that the first pawl 34 will be inserted into the hole 82*a* of the bracket 82 when the base member 31 is rotated in the direction indicated by the arrow 102. Further, the correction unit 64 computes the amount of correction so that the second pawl 35 will be inserted into the hole 83*a* of the bracket 83 when the moving member 33 is moved along the rail 39 after the base member 31 has been rotated.

Then, based on the computed amount of correction, the operation control unit 63 corrects the position and the posture of the first robot 1 and the second robot 2. When the workpiece 81 is delivered by the carry-in conveyor 54, an error may occur in the position of the workpiece 81. In particular, the position of the mating portion of the workpiece 81 may be displaced from the desired position. In such cases, by performing correction based on the images captured by the first image device 45, the first pawl 34 can be made to engage the bracket 82 without fail in the next step. Further, the second pawl 35 can be made to engage the bracket 83 without fail in the next step. Furthermore, the hand 4 can be made to securely grasp the workpiece 81 in the next step. If it is judged in step 134 that the position of the workpiece 81 is not displaced, control proceeds to step 136.

Figure 5:
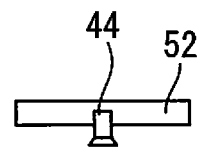
FIG. 5 is a schematic diagram illustrating a first step in the control for conveying the workpiece according to the embodiment.
Figure 5:
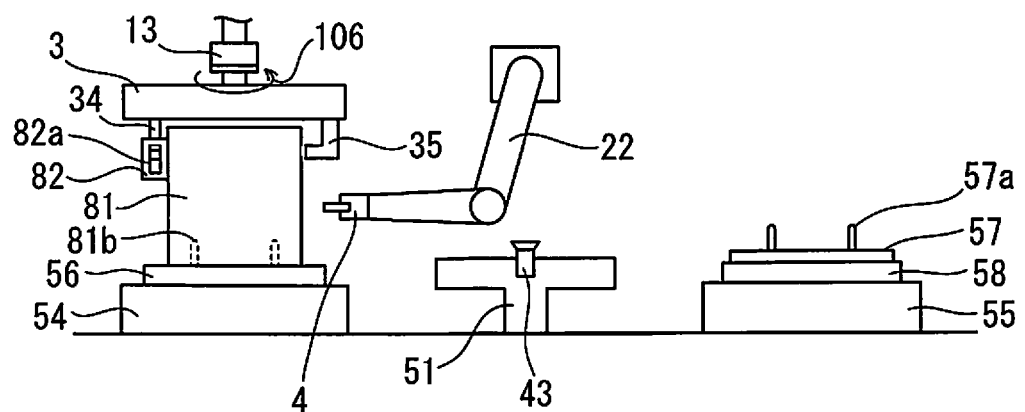

FIG. 5 is a schematic diagram illustrating the condition after the position and the posture of the first robot 1 and the second robot 2 have been corrected. The first pawl 34 is located in a position spaced away from the bracket 82. The second pawl 35 is located in a position spaced away from the bracket 83. The hand 4 is set in a condition ready to grasp the workpiece 81. The hole 82*a* of the bracket 82 is located at the same height as the first pawl 34. Further, the hole 83*a* of the bracket 83 is located at the same height as the second pawl 35. The hand 4 is positioned so as to face the portion to be grasped 81*a* of the workpiece 81. In the present embodiment, correction is performed based on the positions of the brackets 82 and 83 of the workpiece 81, but it is not limited to the above-described embodiment. The correction may be performed based on the position of any other portion of the workpiece 81.

Referring to FIG. 4, the operation control unit 63 in step 136 causes the suspending jig 3 and the hand 4 to engage the workpiece 81. Referring to FIGS. 1, 2, 4, and 5, the pawl portions 4*a* of the hand 4 grasp the portion to be grasped 81*a* of the workpiece 81. In this case, the hand 4 grasps the workpiece 81 at a portion which is lower than the brackets 82 and 83 formed as the mating portions.

Next, the operation control unit 63 causes the suspending jig 3 to engage the workpiece 81. The operation control unit 63 causes the suspending jig 3 to rotate in the horizontal plane, as indicated by the arrow 102. The first pawl 34 is inserted into the hole 82*a* of the bracket 82. FIG. 2 shows the condition in which the first pawl 34 is inserted in the bracket 82. Next, the second pawl 35 is inserted into the hole 83a of the bracket 83 by moving the moving member 33 as indicated by an arrow 105. The suspending jig 3 is made to engage the workpiece 81.

In the present embodiment, the workpiece 81 is first grasped by the hand 4, and then the suspending jig 3 is made to engage the workpiece 81, but it is not limited to the above-described embodiment, the suspending jig 3 may be first made to engage the workpiece 81.

Figure 6:
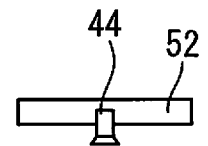
FIG. 6 is a schematic diagram illustrating a second step in the control for conveying the workpiece according to the embodiment.
Figure 6:
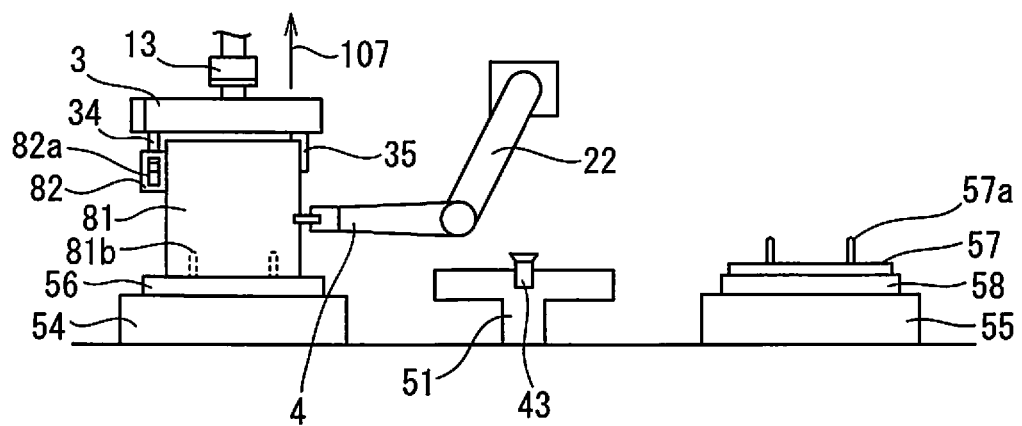

FIG. 6 is a schematic diagram illustrating the condition when the workpiece is grasped by the hand and the suspending jig engages the workpiece. The mating portion of the workpiece 81 is engaged with the engaging portion of the suspending jig 3. The hand 4 grasps the workpiece 81. In the present embodiment, the cooperative control of the first robot 1 and the second robot 2 is started in this condition.

Referring to FIG. 4, in step 137, the first robot 1 and the second robot 2 are operated to suspend the workpiece 81. Referring to FIG. 6, the first robot 1 lifts the workpiece 81 up in the vertical direction as indicated by an arrow 107. In this case, since the cooperative control is performed, the second robot 2 follows the movement of the workpiece 81 while holding the workpiece 81 in the grasped condition.

Figure 7:
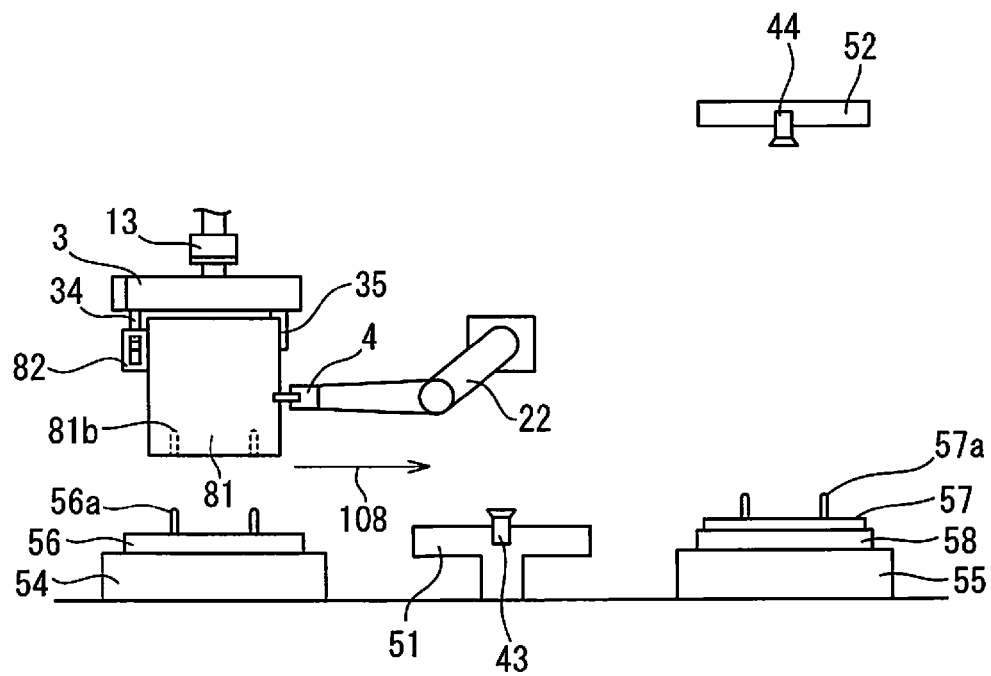
FIG. 7 is a schematic diagram illustrating a third step in the control for conveying the workpiece according to the embodiment.

FIG. 7 is a schematic diagram illustrating the condition when the lifting of the workpiece is completed. The delivery pallet 56 includes a plurality of pins 56a. The bottom portion of the workpiece 81 is formed with insertion holes 81b in which the pins 56a were inserted. As the workpiece 81 is lifted, the pins 56a are removed from the insertion holes 81b. In the present embodiment, the workpiece 81 is lifted up to a predetermined height.

Referring to FIG. 4, the workpiece 81 is moved in step 138 so as to be positioned above the second image device 46. Referring to FIG. 7, the workpiece 81 is moved, as indicated by an arrow 108. In this step, the workpiece 81 is moved translationally in the horizontal direction without rotating the workpiece 81. The workpiece 81 is moved to the position where an image of the bottom face of the workpiece 81 can be captured by the camera 43. In this case, since the cooperative control is performed, the second robot 2 follows the movement of the workpiece 81 while holding the workpiece 81 in the grasped condition.

Figure 8:
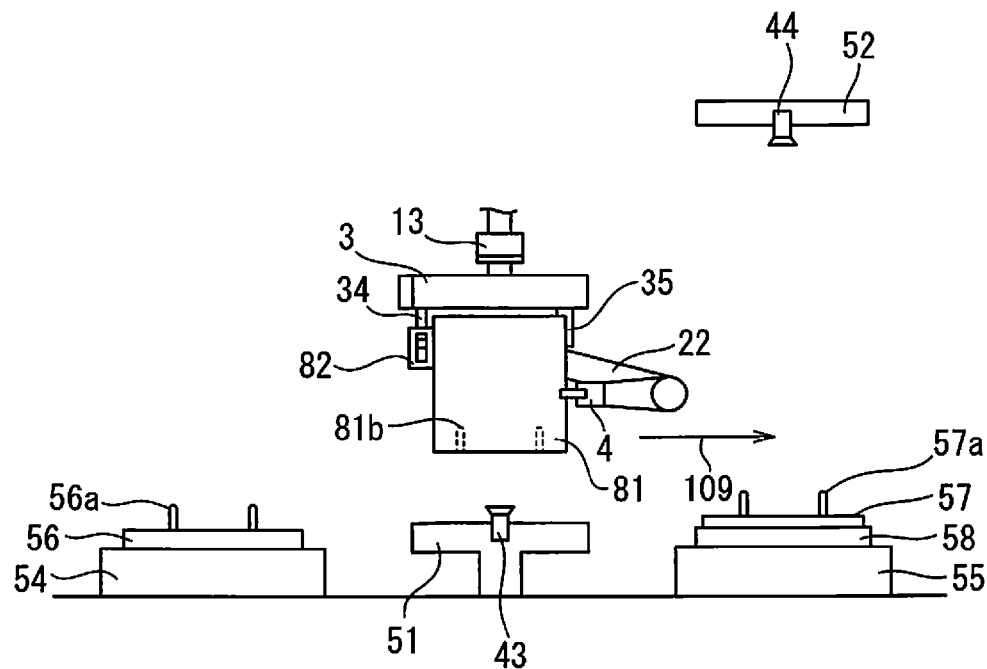
FIG. 8 is a schematic diagram illustrating a fourth step in the control for conveying the workpiece according to the embodiment.

FIG. 8 is a schematic diagram illustrating the condition when the translational movement of the workpiece is completed. In the present embodiment, the workpiece 81 is moved to position directly above the camera 43. The bottom face of the workpiece 81 faces the camera 43. The image of the bottom face of the workpiece 81 can be captured by the camera 43. In the present embodiment, the position and the posture of the first robot 1 and the second robot 2 are corrected based on the positions of the insertion holes 81b of the workpiece 81. The reference image of the bottom face of the workpiece 81 is prestored in the control device 7. The position and the posture of the robots are corrected based on the reference image and the image captured by the camera 43.

Referring to FIG. 4, the second image device 46 in step 139 captures an image of the workpiece 81. In the present embodiment, the camera 43 captures an image of the bottom face of the workpiece 81. The image processing unit 65 processes the captured image. In step 140, the image processing unit 65 computes the amount of positional displacement of the workpiece 81. Then, the image processing unit 65 judges whether or not the amount of displacement is larger than a predetermined threshold. In this step, the horizontal displacement of the workpiece 81 is checked. If the amount of displacement is larger than the predetermined threshold, the image processing unit 65 can judge that the position of the workpiece 81 is displaced. If it is judged in step 140 that the position of the workpiece 81 is displaced, control proceeds to step 141.

In step 141, based on the amount of displacement, the correction unit 64 computes the amount of correction for the position and the posture of the first robot 1 and the second robot 2. The correction unit 64 computes the amount of correction for the first robot 1 and the second robot 2 so that the positions of the insertion holes 81b in the image captured by the camera 43 will are consistent with the positions of the insertion holes 81b in the reference image. Then, the operation control unit 63 corrects the position and the posture of the first robot 1 and the second robot 2 based on the computed amount of correction. In the present embodiment, correction is performed based on the positions of the insertion holes 81b of the workpiece 81, but it is not limited to the above-described embodiment, correction may be performed based on the position of any other portion of the workpiece 81.

When the workpiece 81 is suspended, an error sometimes occurs in the position of the workpiece 81. In the present embodiment, the position of the workpiece 81 being conveyed in a suspended condition can be corrected. If it is judged in step 140 that the position of the workpiece 81 is not displaced, control proceeds to step 142.

Next, referring to FIGS. 1, 4, and 8, the position and the posture of the first robot 1 and the second robot 2 are corrected based on the position of the discharge pallet 57. In step 142, the third image device 47 captures an image of the discharge pallet 57 by the camera 44.

In step 143, the image processing unit 65 computes the amount of positional displacement of the discharge pallet 57. Then, the image processing unit 65 judges whether or not the position of the discharge pallet 57 is displaced. If the amount of displacement of the discharge pallet 57 is larger than a predetermined threshold, the image processing unit 65 can judge that the position of the discharge pallet 57 is displaced. In the present embodiment, the image processing unit 65 judges whether the position of the discharge pallet 57 is displaced or not, based on the positions of the pins 57a of the discharge pallet 57. If it is judged in step 143 that the position of the discharge pallet 57 is displaced, control proceeds to step 144.

In step 144, based on the amount of displacement of the discharge pallet 57, the correction unit 64 computes the amount of correction for the position and the posture of the first robot 1 and the second robot 2. Then, the operation control unit 63 corrects the position and the posture of the first robot 1 and the second robot 2 based on the amount of correction. The amount of correction used here is set so that the insertion holes 81b of the workpiece 81 will be positioned directly above the pins 57a of the discharge pallet 57 when the workpiece 81 is rotationally moved in the next step.

When the discharge pallets 57 and 58 are delivered by the carry-out conveyor 55, the position of the discharge pallet 57 may be displaced from the predetermined position. By correcting the position and the posture of the first robot 1 and the second robot 2 based on the image captured by the third image device, the pins 57a of the discharge pallet 57 can be correctly inserted into the insertion holes 81b of the workpiece 81 in a subsequent step. If it is judged in step 143 that the position of the discharge pallet 57 is not displaced, control proceeds to step 145.

In step 145, the workpiece 81 is moved to position above the discharge pallet 57. Referring to FIG. 8, the workpiece 81 is moved in the horizontal direction as indicated by an arrow 109. At this time, the first robot 1 and the second robot 2 are operated so as to change the orientation of the workpiece 81. The first robot 1 and the second robot 2 rotate the workpiece 81 by 90 degrees in the horizontal plane. Referring to FIG. 1, the first robot 1 and the second robot 2 change the orientation of the workpiece 81 with the swiveling portions 11 and 21 swiveling as indicated by the arrows 101 and 103. In this case, since the cooperative control is performed, the second robot 2 follows the movement of the workpiece 81 while holding the workpiece 81 in the grasped condition.

Figure 9:
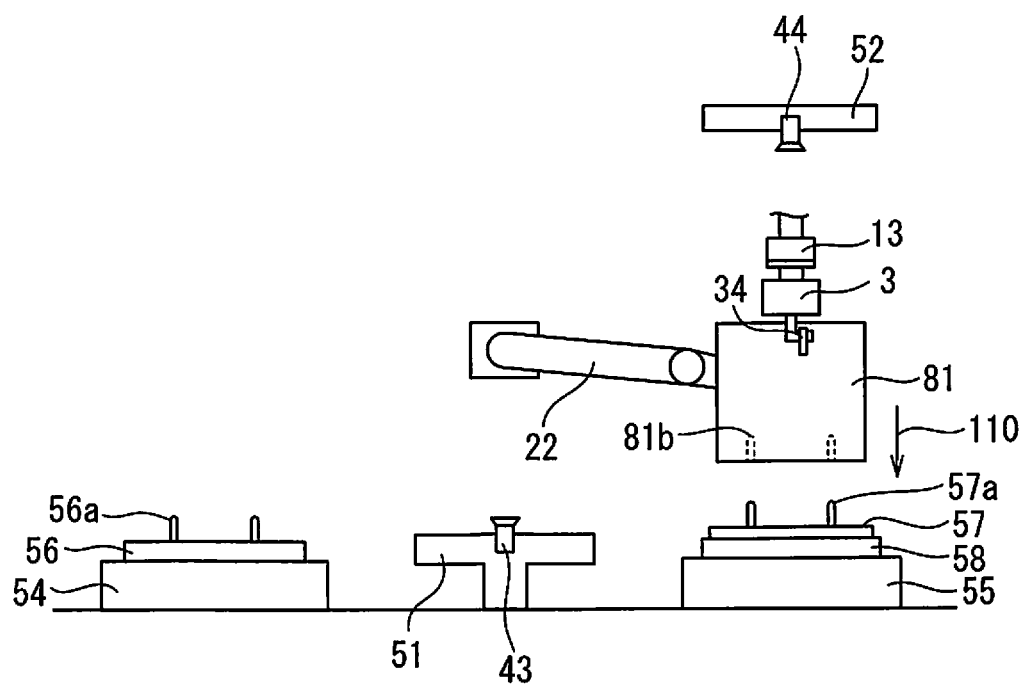
FIG. 9 is a schematic diagram illustrating a fifth step in the control for conveying the workpiece according to the embodiment.

FIG. 9 is a schematic diagram illustrating the condition when the workpiece is moved to position directly above the discharge pallet. Since the position of the workpiece 81 is corrected based on the image captured by the cameras 43 and the image captured by camera 44, the insertion holes 81b of the workpiece 81 are located directly above the pins 57a of the discharge pallet 57.

Next, referring to FIG. 4, the workpiece 81 is placed on the discharge pallet 57 in step 146. Referring to FIG. 9, the workpiece 81 is lowered as indicated by an arrow 110. The pins 57a of the discharge pallet 57 are inserted into the insertion holes 81b of the workpiece 81. In this way, the workpiece 81 is transported to the target position. When the workpiece 81 is transported to the target position, the control device 7 terminates the cooperative control.

Referring to FIGS. 1 and 4, the suspending jig 3 and the hand 4 are respectively disengaged in step 147. Referring to FIG. 2, in the present embodiment, the first pawl 34 and the second pawl 35 are disengaged. By moving the moving member 33, the second pawl 35 is pulled out of the hole 83a of the bracket 83. Next, by rotating the base member 31, the first pawl 34 is pulled out of the hole 82a of the bracket 82. Then, by opening the pawl portions 4a of the hand 4, the hand 4 is disengaged. Thereafter, the suspending jig 3 and the hand 4 are retracted to the predetermined positions.

Next, referring to FIG. 4, in step 148 the control unit 7 drives the movement device of the carry-out conveyor 55 so as to transport the workpiece 81 and the discharge pallet 57 onto the carry-out conveyor 59. Then, the control unit 7 drives the carry-out conveyor 59 to discharge the workpiece 81. Further, the control unit 7 drives the carry-out conveyor 55 to discharge the discharge pallet 58.

In this way, the robot system according to the present embodiment can convey an article by suspending the article using a plurality of robots. This eliminates the need for an operator to suspend the article using a hoist and hold the article in order to prevent it from swaying. The article can be automatically conveyed using the plurality of robots. In the present embodiment, the article is conveyed using two robots, but the article may be conveyed using three or more robots.

The robot system 10 according to the present embodiment conveys the article by performing cooperative operation of the plurality of robots. Since the second robot 2 holds the workpiece 81 in the grasped condition, the workpiece 81 can be conveyed while preventing it from swaying. Furthermore, since the article is conveyed using robots, the article can be conveyed at high speed. Moreover, the use of robots to convey the article makes it possible to change the orientation of the workpiece 81 during conveyance. In this case also, since the cooperative control is performed, the orientation of the workpiece 81 can be changed in a stable manner.

The control device prestores the reference images of the respective robots in the reference position and reference posture, computes the amount of correction for the position and the posture of the robots based on the reference images and the images captured by the image devices, and corrects the position and the posture of the robots based on the amount of correction. As a result, an error which may occur in the position during conveyance can be corrected.

The control device corrects the position and the posture of the robots, based on the images of the mating portions captured by the first image device. By adopting this control, the first robot and the second robot can be made to securely engage the article to be conveyed. Further, the control device corrects the position and the posture of the robots, based on the image of the article captured by the second image device. By adopting this control, the positional displacement of the workpiece being conveyed in a suspended condition can be corrected. Furthermore, the control device corrects the position and the posture of the robots, based on the image of the pallet captured by the third image device. By adopting this control, the positional displacement of the pallet can be corrected. In the present embodiment, by performing control based on the image captured by the second image device and the image captured by the third image device, the pins of the discharge pallet can be prevented from becoming displaced from the holes of the workpiece.

The control device in the present embodiment controls the first robot and the second robot by a single common device, but it is not limited to the above-described embodiment. The control device may comprise a first control device for controlling the first robot and a second control device for controlling the second robot.

Figure 10:
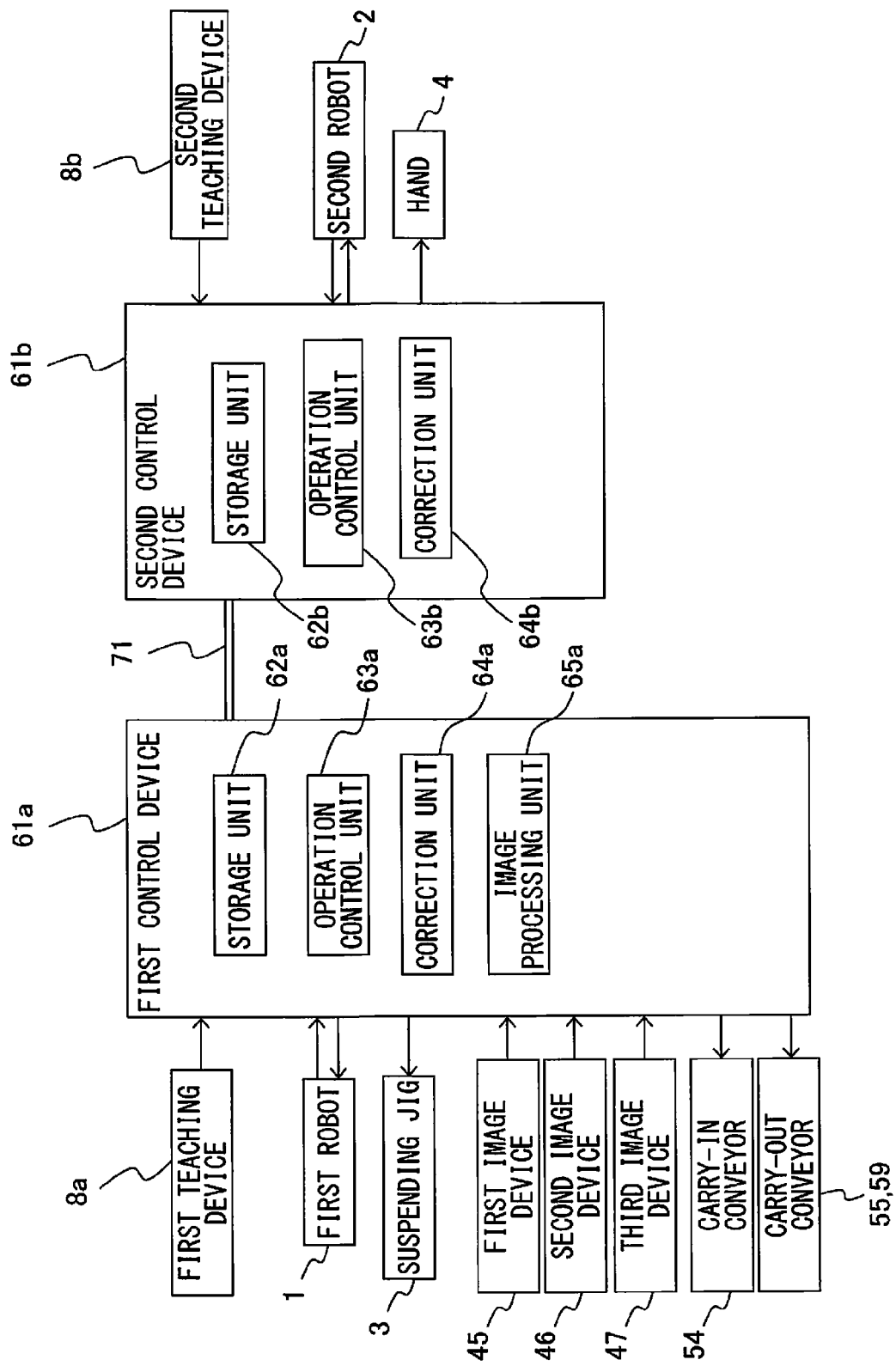
FIG. 10 is a block diagram of an alternative robot system according to the embodiment.

FIG. 10 shows a block diagram of an alternative robot system according to the present embodiment. The alternative robot system comprises a first control device 61a which controls the first robot 1 as well as the suspending jig 3, and a second control device 61b which controls the second robot 2 and the hand 4. The first control device 61a and the second control device 61b are interconnected by a communication device which includes a communication line 71. The communication device can perform communication using, for example, an Ethernet (registered trademark) network. The first control device 61a and the second control device 61b perform cooperative control while communicating with each other via the communication device.

In the cooperative control performed by the alternative robot system, the first control device 61a functions as a device for controlling the master robot, and the second control device 61b functions as a device for controlling the slave robot.

The first control device 61a includes a storage unit 62a, an operation control unit 63a, and a correction unit 64a. Similarly to the first control device 61a, the second control device 61b includes a storage unit 62b, an operation control unit 63b, and a correction unit 64b. A first teaching device 8a is connected to the first control device 61a. A second teaching device 8b is connected to the second control device 61b. In this way, the control device and teaching device are provided for each of the robots. The carry-in conveyor 54 and the carry-out conveyors 55 and 59 are controlled by the first control device 61a.

In the example of the robot system shown in FIG. 10, the first control device 61a includes an image processing unit 65a. The image of the first image device 45, the image of the second image device 46, and the image of the third image device 47 are input to the first control device 61a. Then, the amount of displacement is computed by the image processing unit 65a. Based on the amount of displacement, the correction unit 64a in the first control device 61a computes the amount of correction for the position and the posture of the first robot 1. The operation control unit 63*a* corrects the position and the posture of the first robot 1. Further, based on the amount of displacement, the correction unit 64*b* in the second control device 61*b* computes the amount of correction for the position and the posture of the second robot 2. The operation control unit 63*b* corrects the position and the posture of the second robot 2. In this way, a dedicated control device and teaching device may be provided for each robot, and cooperative control may be performed by communicating via the communication device.

The suspending jig in the present embodiment includes the first pawl and the second pawl, the first pawl is made to engage the first bracket of the workpiece by rotating the base member, and the second pawl is made to engage the second bracket of the workpiece by moving the moving member. The suspending jig is not limited to the above-described embodiment, but any configuration which can suspend the workpiece can be employed.

In the present embodiment, each robot has been described as being configured as a six-axis robot, however, the configuration is not limited to the above-described embodiment, but the present invention can be equally applied to a robot of any configuration.

The present embodiment has been described by illustrating an example of conveyance control in which the orientation of the workpiece is changed during conveyance, but it is not limited to the above-described embodiment. The orientation may not be changed during conveyance.

According to the present invention, a robot system which conveys an article in a suspended condition using a robot can be provided.

In the above-described control process, the order of steps can be arbitrarily changed without changing the function or the effect. The above embodiments may be suitably combined. Throughout the above drawings, the same or corresponding parts are designed by the same reference numerals. The above embodiments are only illustrative and not restrictive of the invention. Further, the embodiments include alterations which could be made to the embodiments described in the appended claims.

The invention claimed is:

1. A robot system for conveying an article, comprising:
    a suspending jig which includes two engaging portions for respectively engaging with two mating portions of the article, and which suspends the article;
    a first robot which supports the suspending jig;
    a hand which grasps the article when the article is suspended;
    a second robot which supports the hand; and
    a control device which performs cooperative control for causing the first robot and the second robot to operate cooperatively; wherein
    the suspending jig includes a base member attached to a distal end of an arm of the first robot,
    an engaging portion among the two engaging portions is supported by the base member, engages a mating portion among the two mating portions, and is rotatable with respect to the base member about an rotation axis extending in the vertical direction by actuation of a drive device so as to change an orientation relative to the base member,
    the other engaging portion among the two engaging portions is configured to move with respect to the base member, and moves by actuation of a drive device so as to engage the other mating portion among the two mating portions,
    the hand grasps the article at a portion which is lower than the mating portions, and
    the control device performs cooperative control so that the position of the hand relative to the suspending jig is maintained constant, and so that the article is conveyed while a condition in which the hand grasps the article is maintained.

2. The robot system according to claim 1, wherein the control device is configured as a single device which controls the first robot and the second robot.

3. The robot system according to claim 1, wherein
    the control device includes a first control device which controls the first robot and a second control device which controls the second robot,
    the first control device and the second control device are interconnected via a communication line so as to perform cooperative control.

4. The robot system according to claim 1, further comprising an image device for capturing an image of the article or a pallet on which the article is placed, wherein
    the control device prestores a reference image when the first robot and the second robot are in a reference position and a reference posture, computes an amount of correction for the position and the posture of the first robot and the second robot based on the image captured by the image device and the reference image, and corrects the position and the posture of the first robot and the second robot based on the amount of correction.

5. The robot system according to claim 4, further comprising a carry-in device for delivering the article, wherein
    the image device includes a camera attached to the suspending jig, and captures an image of the mating portions when the carry-in device transports the article to a predetermined position, and
    the control device corrects the position and the posture of the first robot and the second robot based on the image of the mating portions captured by the image device.

6. The robot system according to claim 4, wherein the image device includes a camera immovably supported on a floor and captures an image of the article on the way of conveying the article in a suspended condition, and
    the control device corrects the position and the posture of the first robot and the second robot based on the image of the article captured by the image device.

7. The robot system according to claim 4, further comprising a carry-out device for discharging the article which is placed on the discharge pallet, wherein
    the image device includes a camera immovably supported on a floor, and captures an image of the discharge pallet when the carry-out device transports the discharge pallet to a predetermined position, and
    the control device corrects the position and the posture of the first robot and the second robot based on the image of the discharge pallet captured by the image device.

* * * * *